United States Patent
McCoy

(10) Patent No.: US 7,587,018 B2
(45) Date of Patent: Sep. 8, 2009

(54) PROCESS FOR MANUFACTURING ENHANCED THERMAL CONDUCTIVITY OXIDE NUCLEAR FUEL AND THE NUCLEAR FUEL

(75) Inventor: John Kevin McCoy, Lynchburg, VA (US)

(73) Assignee: Areva NP Inc., Lynchburg, VA (US)

( * ) Notice: Subject to any disclaimer, the term of this patent is extended or adjusted under 35 U.S.C. 154(b) by 0 days.

(21) Appl. No.: 11/651,368

(22) Filed: Jan. 8, 2007

(65) Prior Publication Data

US 2008/0043896 A1 Feb. 21, 2008

Related U.S. Application Data

(62) Division of application No. 10/692,646, filed on Oct. 24, 2003.

(51) Int. Cl.
*G21C 4/00* (2006.01)
(52) U.S. Cl. .................. 376/414; 376/412; 376/409; 376/421; 376/426; 427/5; 427/228
(58) Field of Classification Search .............. 376/409, 376/421, 426, 414
See application file for complete search history.

(56) References Cited

U.S. PATENT DOCUMENTS

| | | | | |
|---|---|---|---|---|
| 2,938,839 A * | 5/1960 | Fahnoe et al. ............... 428/613 |
| 2,950,238 A * | 8/1960 | Nicholson .................... 376/411 |
| 3,035,325 A * | 5/1962 | Nicholson et al. ........... 264/29.1 |
| 3,129,141 A * | 4/1964 | Burnham, Jr. et al. ........ 376/421 |
| 3,164,487 A * | 1/1965 | Carley-Macauly et al. ..... 427/6 |
| 3,166,614 A * | 1/1965 | Taylor .......................... 264/0.5 |
| 3,211,626 A | 10/1965 | Nerenstone et al. |
| 3,276,968 A * | 10/1966 | Ingleby ....................... 376/411 |
| 3,293,332 A * | 12/1966 | Ingleby ....................... 264/0.5 |
| 3,472,734 A * | 10/1969 | Boettcher ..................... 376/413 |
| 3,842,283 A * | 10/1974 | Chenebault et al. .......... 376/253 |
| 3,907,948 A | 9/1975 | Gyarmatti et al. |
| 4,110,159 A | 8/1978 | Lee |
| 4,156,147 A * | 5/1979 | Naum et al. .............. 250/515.1 |
| 4,313,973 A * | 2/1982 | McMurtry et al. ............ 427/205 |
| 5,342,390 A * | 8/1994 | Slater et al. .................. 606/205 |
| 5,429,775 A | 7/1995 | Hirai et al. |
| 2004/0052326 A1 * | 3/2004 | Blanpain et al. ............. 376/411 |

FOREIGN PATENT DOCUMENTS

DE 3934826 * 4/1991 .................. 376/309
JP 07209464 * 8/1995 .................. 376/309

OTHER PUBLICATIONS

International Search Report from PCT/US04/3467, filed Oct. 21, 2004.
Supplementary European Search Report from EP 04 80 99 88.

* cited by examiner

*Primary Examiner*—Rick Palabrica
(74) *Attorney, Agent, or Firm*—Kenyon & Kenyon LLP

(57) ABSTRACT

A nuclear fuel and a method to produce a nuclear fuel wherein a porous uranium dioxide arrangement is provided, the arrangement is infiltrated with a precursor liquid and the arrangement is thermally treated such the porous uranium dioxide arrangement is infiltrated with a precursor liquid, followed by a thermal treating of the porous uranium dioxide arrangement with the infiltrated precursor liquid such that the precursor liquid is converted to a second phase.

4 Claims, 1 Drawing Sheet

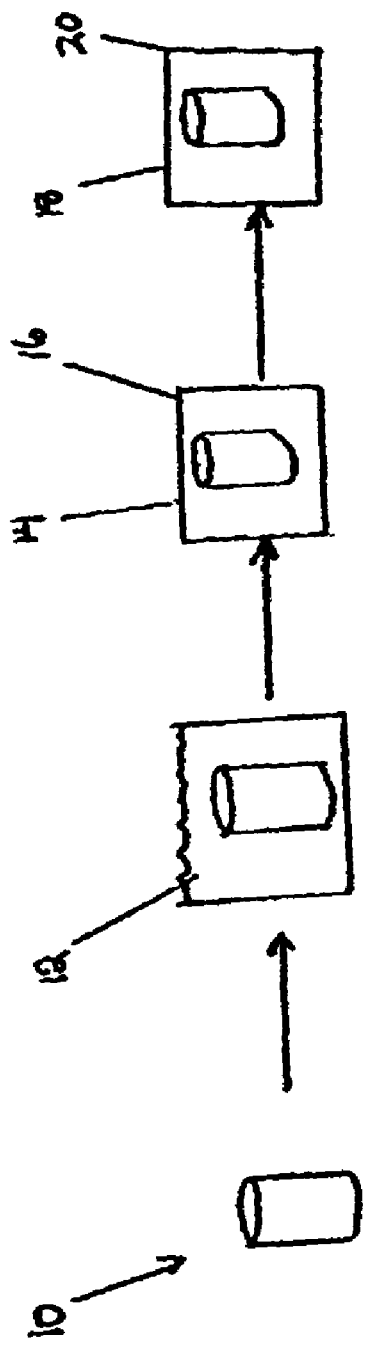

PROCESS FOR MANUFACTURING ENHANCED THERMAL CONDUCTIVITY OXIDE NUCLEAR FUEL AND THE NUCLEAR FUEL

CROSS-REFERENCE TO RELATED APPLICATION

This application is a divisional of U.S. application Ser. No. 10/692,646, filed Oct. 24, 2003, herein incorporated by reference.

FIELD OF THE INVENTION

The present invention relates to fuel for nuclear reactors. More specifically, the present invention provides a nuclear reactor fuel and a process for making a nuclear reactor fuel which exhibits enhanced thermal conductivity as compared to conventionally used uranium dioxide nuclear reactor fuel.

BACKGROUND INFORMATION

Present-day nuclear power reactor fuels in use for commercial power generation are based on uranium dioxide. The uranium dioxide fuel is commonly a product of several manufacturing steps including pressing a uranium dioxide powder into a pellet shape and subsequently firing the pellet to remove any formed voids.

The wide-spread use of uranium dioxide fuel is due primarily to the many desirable characteristics of the uranium dioxide material, including a high density of uranium atoms necessary for producing a nuclear reaction, inertness and insolubility of the uranium dioxide in high temperature water, a high melting point and an absence of neutron poisons which could affect reactor performance. Although uranium dioxide is satisfactory for use in light water reactors, uranium dioxide also has several significant drawbacks which limit its overall effectiveness. Chief among the drawbacks is a relatively low thermal conductivity of uranium dioxide which imposes significant limitations on reactor operations. The inability of uranium dioxide to remove large quantities of heat effectively limits overall reactor operation and also compromises reactor operations during transient events such as loss of coolant accidents (LOCA). The nuclear industry has made attempts to increase thermal conductivity of uranium dioxide fuel, but none of the attempts have been successful. Despite the drawbacks, uranium dioxide, in unmodified form, remains the dominant fuel for nuclear power reactors.

In general, heat produced in nuclear fuel must be conducted through the body of the fuel, normally in the pelletized form, and an external cladding, normally a zirconium alloy, to a surrounding coolant layer in order to properly cool the fuel and prevent pellet degradation. The surrounding coolant layer is moved past the external cladding to provide a consistent temperature for removal of heat from the fuel. During transient reactor conditions, such as when the coolant flows past the external cladding unevenly, the steady removal of heat from the pellet is disrupted. During loss-of-coolant accidents, operational safety is compromised due to accumulating heat in the fuel and the inability of the uranium dioxide matrix to withstand the increased temperatures. This thermal conductivity characteristic of conventional uranium dioxide fuel necessitates operating the reactor at reduced power in order to achieve acceptable overall plant safety margins. Operating the reactor at the reduced power levels consequently affects overall plant operating costs. Current nuclear fuels using uranium dioxide also have a limited burn-up capacity. The limited burn-up capacity reduces the overall cost effectiveness of the fuel. The limited burn-up capacity results from greater fission gas release inside the fuel cladding over time. The greater fission gas release thereby results in higher fuel rod internal pressure, potentially leading to cladding deterioration due to the higher stress. The elevated temperatures of the existing fuel also stresses the fuel cladding thereby limiting overall service life.

There is a need to provide a nuclear fuel which will provide enhanced thermal conductivity compared to conventional uranium dioxide fuel currently used in nuclear power reactors.

There is a further need to provide a nuclear fuel which will result in greater safety of the nuclear reactor under accident conditions, such as loss of coolant accidents.

There is a still further need to provide a nuclear fuel which will possess superior burn-up capabilities compared with conventional uranium dioxide nuclear fuels, thereby allowing greater fuel utilization, improved economy, and limited fission gas release.

SUMMARY

It is an object of the present invention to provide a nuclear fuel which provides enhanced thermal conductivity compared to conventional uranium dioxide nuclear fuel currently used in nuclear power reactors.

It is also an object to provide a nuclear fuel which will result in greater safety of the nuclear reactor under accident conditions, such as loss of coolant accidents.

It is furthermore an object of the present invention to provide a nuclear fuel which will possess burn-up capabilities superior to that of conventional uranium dioxide fuels, thereby allowing greater fuel utilization and limiting fission gas release.

These and other objects of the present invention are achieved as illustrated and described. The invention provides a method to produce uranium dioxide fuel which has increased thermal conductivity compared to conventional nuclear fuel. The method recites providing a porous uranium dioxide arrangement, infiltrating the porous uranium dioxide arrangement with a precursor liquid, and thermally treating the porous uranium dioxide arrangement with the infiltrated precursor liquid such that the precursor liquid is converted to a second phase.

The invention also provides a nuclear fuel. The present invention recites an arrangement having a matrix of uranium dioxide and silicon carbide interspersed in the matrix of uranium dioxide.

BRIEF DESCRIPTION OF THE DRAWINGS

FIG. 1 provides a schematic representation of a process for making a fuel assembly.

DETAILED DESCRIPTION

The present invention provides a nuclear fuel and a method to make the nuclear fuel. Referring to FIG. 1, a uranium dioxide arrangement 10 is provided for processing. The uranium dioxide arrangement 10 may be in any shape, such as a pellet, ball or rod for example. The uranium dioxide arrangement 10 should have a porous matrix to allow infiltration of material into the arrangement 10 when contacted by a precursor liquid 12. The porous matrix of the uranium dioxide arrangement 10 can be formed, for example, by pressing uranium dioxide powder into a "green" or unfired shape. The porous matrix may also be formed by a bisque firing that does not fully densify the uranium dioxide arrangement 10.

A liquid precursor 12 is added to the uranium dioxide arrangement 10 to infiltrate the uranium dioxide matrix. The precursor liquid 12 may be, for example, allylhydridopolycarbosilane (AHPCS). The precursor liquid 12 can be configured to penetrate the porous matrix of the uranium dioxide arrangement 10 without damaging the overall uranium dioxide matrix configuration. The uranium dioxide arrangement 10 may be sprayed or, as illustrated, immersed in the liquid precursor 12, to cause contact between the arrangement 10 and the liquid precursor 12. The composition of the precursor liquid 12 allows incorporation of the precursor liquid 12 into the pores of the porous matrix of the uranium dioxide arrangement 10. The time of contact of the precursor liquid 12 to the uranium dioxide arrangement 10 may be chosen such that incorporation of the precursor liquid 12 into all of the pores in the uranium dioxide matrix occurs in a single contact cycle, for example. To promote infiltration of the precursor 12 into the arrangement 10, the arrangement may be evacuated before infiltration, or the precursor may be applied under pressure, or both. Alternatively, the precursor liquid 12 may contact the uranium dioxide arrangement 10 for a time such that a single contact cycle does not result in incorporation of the precursor liquid 12 into all of the pores of the porous matrix.

After the precursor liquid 12 has contacted the uranium dioxide arrangement 10 and been incorporated into the matrix of the arrangement 10, at least partially, the arrangement 10 may then be cured. Curing 14 may be through placement of the uranium dioxide arrangement 10 into a furnace 16 between, for example, 180 degrees centigrade and 400 degrees centigrade. Curing time may be, for example, between 2 hours and 8 hours. Other curing times and temperatures may be used. The curing 14 process converts the precursor liquid 12 into a solid polymer, wherein the solid polymer is positioned in the matrix of the uranium dioxide arrangement 10.

Next, the arrangement 10 is then thermally treated 18 such that the polymer positioned in the uranium dioxide arrangement 10 is converted to a second phase. In the current exemplary embodiment of the invention, the allylhydridopolycarbosilane, which has turned into a polymer in the uranium dioxide arrangement 10 from the curing operation, is converted into silicon carbide through firing the arrangement 10 in a furnace 20. The furnace temperatures may be chosen, for example, from between 800 degrees centigrade to 1700 degrees centigrade. The residence time for the uranium dioxide matrix in the furnace 20 may be, for example, 2 hours to 8 hours. Other residence times may be used such that the polymer is converted into silicon carbide. Residence times may be varied to minimize ultimate volume change of the pellet. The resulting product is a nuclear fuel which has silicon carbide incorporated into the matrix of the uranium dioxide.

The method steps of infiltrating the porous uranium dioxide arrangement 10 with a precursor liquid 12 and thermally treating the porous uranium dioxide arrangement 10 with the infiltrated precursor liquid 12, which can include both the curing and the firing of the arrangement, may then be repeated, if desired, to allow more incorporation of precursor liquid 12 into the matrix of the uranium dioxide if total incorporation has not occurred.

The present invention provides an increase in the thermal conductivity of nuclear fuel thereby resulting in increased fuel performance during loss of coolant accidents. The present invention also provides for reduced fuel temperatures and internal fuel pellet heat. Due to the possibility of creating overall geometric sizes similar to the geometries used in conventional reactors, existing nuclear power reactors may utilize fuel described in the present invention. Furthermore, through the use of the nuclear fuel with increased thermal conductivity, existing reactors may be operated at higher power levels to provide superior economic performance. Maximum fuel burn-up is also increased as lower overall fuel temperatures limit fission gas release, thereby limiting fuel rod internal pressure. Superior fuel burn-up also allows less waste to be produced for ultimate disposal. The reduced fuel temperatures also reduce the stresses imposed on the cladding, reduce fuel cracking and relocation and reduce life-limiting fuel swelling.

Use of silicon carbide is compatible with existing light-water reactors, thermally, chemically and neutronically. New reactor systems, therefore, do not have to be created in order to utilize a fuel containing silicon carbide. The thermal conductivity of silicon carbide is high so that substantial increases in overall fuel thermal conductivity can be achieved with only a small decrease in the density of uranium atoms. As an example, a thermal conductivity of 50 percent is expected for a 10 percent volume loading of silicon carbide.

Advantages for a process of producing a nuclear fuel using silicon carbide incorporated into the matrix of the arrangement include the limited addition of an infiltration station and an inert-gas curing/firing furnace with provision for combustion of hydrogen offgassed from the precursor to existing facilities used for production of nuclear fuel. The process of the current application also allows the precursor liquid to penetrate the entire body of the fuel arrangement so that the resulting second phase, after thermal firing, penetrates to the center of the pellet, thereby producing a uniform overall fuel product. The second phase of the invention may form as a continuous network rather than as discontinuous particles, so the overall fuel pellet is effective in conducting heat from the core of the fuel pellet to the exterior surface. Additionally, the liquid infiltrant produces a high yield of the second phase, so the infiltration and conversion process need only be repeated a few times.

The current invention provides an advantage over processes mixing powders of uranium dioxide and silicon carbide in that for small volume fractions, the second phase forms discrete particles which are thermally insulated by the uranium dioxide. For large volume fractions, an excessive amount of uranium is displaced affecting overall fuel composition.

The current invention also provides an advantage over chemical vapor infiltration for placement of silicon carbide on uranium dioxide. Such chemical vapor infiltration methods produce uneven placement of silicon carbide on an exterior of a fuel element with higher concentrations of silicon carbide on the exterior of the fuel. Costly equipment is needed for deposition of the chemical vapor on the uranium dioxide. Placement of the chemical vapor is also uneven, resulting in a final product widely varying composition. Additionally, methyltrichlorosilane, used in the deposition of silicon carbide, results in hydrogen chloride gas production as a waste product, thereby complicating waste disposal issues and increasing overall cost.

The current invention additionally provides advantages over mixing uranium dioxide with whiskers of silicon carbide. The whiskers, discrete arrangements of silicon carbide, prevent effective sintering of the arrangement. Moreover, silicon carbide whiskers mixed with a uranium dioxide powder would result in uneven silicon carbide distribution.

In the foregoing specification, the invention has been described with reference to specific exemplary embodiments, thereof. It will, however, be evident that various modifications and changes may be made thereunto without departing from the broader spirit and scope of the invention as set forth in the claims. The specification and drawings are accordingly to be regarded in an illustrative rather than a restrictive sense.

What is claimed is:

1. A nuclear fuel, comprising:
   an arrangement having a matrix of uranium dioxide; defining pores; and
   silicon carbide interspersed in the pores of the matrix of uranium dioxide, wherein
   the nuclear fuel is suitable for use in light water reactor.

2. The nuclear fuel according the claim 1, wherein the arrangement is pellet shaped.

3. The nuclear fuel according to claim 1, wherein a total volume of the arrangement is comprised of up to 10% silicon carbide on a volumetric basis.

4. The nuclear fuel according to claim 3, wherein the silicon carbide is incorporated into all of the pores of the matrix of uranium dioxide.

* * * * *